Dec. 24, 1957 E. J. DIEBOLD 2,817,805

FLUX REVERSAL CIRCUIT FOR COMMUTATING REACTORS OF MECHANICAL RECTIFIERS

Filed April 15, 1954 10 Sheets-Sheet 1

INVENTOR.
EDWARD JOHN DIEBOLD

BY

Ostrolenk & Faber

ATTORNEYS

INVENTOR.
EDWARD JOHN DIEBOLD
BY
Ostrolenk & Faber
ATTORNEYS

INVENTOR.
EDWARD JOHN DIEBOLD
BY
Ostrolenk & Faber
ATTORNEYS

FIG. 4

GENERAL EQUATIONS

1 — $e_{10} + e_1 = e_4 + e_7$

2 — $i_1 = i_d + i_7$

3 — $e_7 = i_7 R$

4 — $\int_0^T e_{10}\,dt + \int_0^T e_1\,dt = \int_0^T e_4\,dt + \int_0^T e_7\,dt$ 5 — $\int_0^T e\,dt = \int_0^T N\,d\Phi = N(\Phi_T - \Phi_0) = 0$ 6 — : INSERT ⑤ IN ④: $0 + 0 = 0 + \int_0^T e_7\,dt \qquad \int_0^T e_7\,dt = 0$ 7 — $\int_0^T e_7\,dt = R\int_0^T i_7\,dt = 0$ INTERVAL $u$ 8 — $i_1 = 0$ 9 — $i_7 = -i_d$ 10 — $\int_{t_0}^{t_{16}} e_4\,dt = 0$ 11 — $Q_u = \int_0^{t_{16}} i_7\,dt = -\int_0^{t_{16}} i_d\,dt = -i_d u$

INTERVAL $S$

12 — $e_4 = 0$

13 — $e_7 = e_{10} + e_1$

14 — $i_7 R = e_{10} + e_1$

15 — $i_1 = i_{15}$

16 — $i_7 = i_{15} - i_d$

17 — $Q_S = \int_{t_{16}}^T i_7\,dt = \int_{t_{16}}^T i_{15}\,dt - \int_{t_{16}}^T i_d\,dt$

TOTAL CYCLE

18 — $Q_U + Q_S = \int_0^{t_{16}} i_7\,dt + \int_{t_{16}}^T i_7\,dt = \int_0^T i_7\,dt = 0$ 19 — $Q_U + Q_S = -\int_0^{t_{16}} i_d\,dt + \int_{16}^T i_{15}\,dt - \int_{t_{16}}^T i_d\,dt = \int_{t_{16}}^T i_{15}\,dt - \int_0^T i_d\,dt$ 20 — $\int_{t_{16}}^T i_{15}\,dt = i_d T$

INVENTOR.
EDWARD JOHN DIEBOLD

BY
Ostrolenk & Faber
ATTORNEYS

INVENTOR.
EDWARD JOHN DIEBOLD

BY
Ostrolenk & Faber

ATTORNEYS

INVENTOR.
EDWARD JOHN DIEBOLD
BY
Ostrolenk & Faber
ATTORNEYS

Dec. 24, 1957  E. J. DIEBOLD  2,817,805

FLUX REVERSAL CIRCUIT FOR COMMUTATING REACTORS OF MECHANICAL RECTIFIERS

Filed April 15, 1954  10 Sheets-Sheet 7

INVENTOR.
EDWARD JOHN DIEBOLD

BY
Ostrolenk & Faber
ATTORNEYS

INVENTOR.
EDWARD JOHN DIEBOLD

BY
Ostrolenk & Faber
ATTORNEYS

INVENTOR.
EDWARD JOHN DIEBOLD

BY
Ostrolenk & Faber
ATTORNEYS

INVENTOR.
EDWARD JOHN DIEBOLD

BY

Ostrolenk & Faber
ATTORNEYS

United States Patent Office 2,817,805
Patented Dec. 24, 1957

2,817,805

FLUX REVERSAL CIRCUIT FOR COMMUTATING REACTORS OF MECHANICAL RECTIFIERS

Edward John Diebold, Ardmore, Pa., assignor to I-T-E Circuit Breaker Company, Philadelphia, Pa., a corporation of Pennsylvania Application April 15, 1954, Serial No. 423,358

14 Claims. (Cl. 321—48)

My invention relates to the voltage control, by means of partial flux reversal, for mechanical rectifiers.

In my copending application Serial Number 212,017, filed February 21, 1951, now Patent No. 2,693,569, I described another pre-excitation circuit for mechanical rectifiers, including a compensation for the non-linear hysteresis loop. This former application applies to mechanical rectifiers with three-phase bridge circuits, in which the commutating reactors operate in both ways, i. e. in the positive and in the negative direction. Output voltage control of such rectifiers is effected by rotating the synchronous motor of the mechanism, as shown in my application Serial No. 331,467, filed January 15, 1953, now Patent No. 2,759,141, on a regulator for mechanical rectifiers.

This new invention relates to mechanical rectifiers in which the current through the commutating reactor is the current of only one contact, i. e. a single way current. Mechanical rectifier circuits having such series connection of commutating reactor and contact are actually more varied and more promising than the one described in my previous patent application. The desirability of such circuits is shown, for example, in my copending application Serial No. 361,670, filed June 15, 1953 and Serial No. 361,699, filed June 15, 1953, now Patent No. 2,774,882. Another well known circuit will be shown as a practical example within this disclosure.

The pre-excitation of the commutating reactors and their control under all circumstances have been the major obstacle in the application of many most promising circuits for mechanical rectifiers. The present invention permits the application of desirable mechanical rectifier circuits by providing a voltage control by magnetic means, without interfering with the pre-excitation of the commutating reactor at the make and at the break.

The problems which I am trying to solve may be stated as follows:

(1) When a contact of the mechanical rectifier is closed the core of the commutating reactor connected to it should be in a state of magnetization which provides a satisfactory make step, i. e. a make step current of low enough magnitude, to prevent damage to the contacts.

(2) After the contact has been closed for the full time required to carry the current, then it should be opened. To open the contact, the core of the commutating reactor associated with the opening contact, should go through a break step. The step current of this break step should be of sufficient length to permit correct opening of the contacts under all circumstances.

(3) In the interval between the opening of the contact and the next succeeding closing of the same contact, the commutating reactor core associated with it should be reversed in its magnetic flux, at least partially. The amount of flux reversal of the commutating reactor core will determine, at the subsequent closing of the contact, the amount of voltage drop taken by the commutating reactor which provides for the voltage control of the mechanical rectifier output. This is identical with the operation of a magnetic amplifier.

The different duty which must be performed by the core of any one commutating reactor during each and every cycle of its operation is contradictory. In the case 1, positive bias of unvarying magnitude is required. In the case 2, a negative bias current, variable in time, and depending on the condition of operation, is required. In the case 2, a positive bias current of variable magnitude and variable duration is required, independent of the conditions of operation but depending on the desired voltage control of the mechanical rectifier.

Attempts to fulfill, by one circuit, three different conditions, the first two of which are invariable, and the third being variable, have always failed. A compromise was necessary, leading either to insufficient voltage control, or to wear on the contacts due to improper pre-excitation. The problem, therefore, can be stated as trying to satisfy three different conditions by means of only one core within the short interval of only one cycle.

*Solution of the problem—principle*

It is possible to solve the above mentioned problem, because the three parts of the operations which occur in the same commutating reactor core, once during each cycle, do not have to occur at the same time. It will be described below, how the time sequence of these events follows and that it is possible to keep them apart at all times. The idea of the solution, therefore, consists of providing three different circuits influencing the same commutating reactor core at subsequent times, and never simultaneously.

Each of these circuits influences the core of the commutating reactor by means of a winding around it. The correct solution for any separate circuit requires that the winding carries the current only when it must influence the commutating reactor core, and carries a negligible or zero current during the rest of the time. The problem, therefore, has been changed into the provision of pre-excitation and control circuits, carrying a substantial amount of current only for a short time and carrying no current during most of the time of one cycle.

The present disclosure deals with a voltage control circuit. It provides the correct amount of flux reversal in the commutating reactor cores by means of a control current. This current, however, flows only during the time that neither break or make pre-excitation of the commutating reactor core are needed, and their respective currents are held at zero. Inversely, the control current of the flux reversal is held at zero. Inversely, the control current of the flux reversal is held at zero during either make or break pre-excitation.

An object of my invention is to provide a flux reversal circuit for a commutating reactor of a mechanical rectifier.

Another object of my invention is to provide voltage control for a mechanical rectifier by means of a flux reversal circuit which is independent of the pre-excitation circuit.

A further object of my invention is to provide a flux reversal circuit for a mechanical rectifier in which the circuit through the commutating reactor is the circuit of only one contact.

These and other objects of my invention will be apparent from the following description when taken in connection with the drawings, in which:

Figures 2 and 3 show the operation of the rectifier of Figure 1, in which Figure 2 illustrates operation at or near highest voltage output and Figure 3 at the lowest voltage output.

Figure 4 illustrates the relationships which existed in the circuit as expressed in mathematical equations.

Figure 6 illustrates the conditions existing in the circuit of Figure 5.

Figure 12 shows, at the top, the voltage across the commutating reactor.

Figure 13 shows in the upper trace, the current through the commutating reactor and contact as compared to the voltage of the commutating reactor in the lower trace.

Figure 14 is similar to Figure 13 and illustrates the conditions with a smaller control current in the flux reversal circuit.

Figures 15 and 16 show the voltage wave under the same conditions as Figures 13 and 14, respectively.

Figures 17 and 18 show the voltage across the contacts of the mechanical rectifier with and without flux reversal respectively.

Figures 19 and 20 show in their upper trace the current through the contact and the lower trace, the voltage across the commutating reactor. The figures were taken respectively without and with flux reversal.

Figure 1:
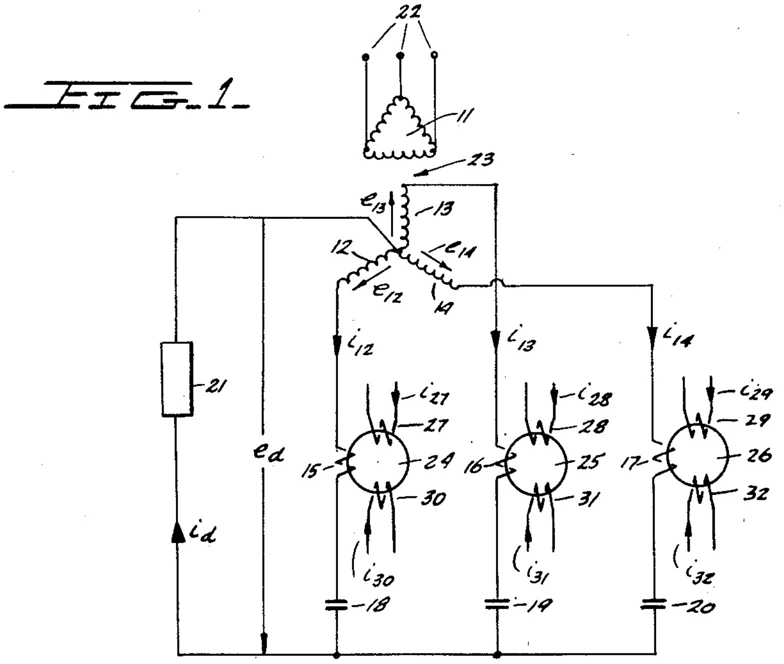
Figure 1 is a simplified drawing of a three phase mechanical rectifier.

Figure 1 is a simple mechanical rectifier circuit for three phase one-way rectification; 22 is a source of three phase A.-C. power; 23 a three phase transformer which a delta connected primary 11 and a star connected secondary with the windings 12, 13 and 14. These windings are connected to the commutating reactor coils 15, 16 and 17 which are then connected to the contacts 18, 19 and 20 which feed the load 21. The contacts are opened and closed in synchronism with the A.-C. voltage, as described in my applications Serial No. 331,467 and Serial No. 307,024. The commutating reactor cores 24, 25, 26 bear the auxiliary windings 27, 28, 29 and 30, 31, 32.

The object of the invention is to provide a control current in the windings 30, 31, 32 for the voltage control of the mechanical rectifier by partial flux reversal of the commutating reactor cores, without interfering with the make or break pre-excitation.

Figures 2 and 3 show the operation of the mechanical rectifier circuit in Figure 1. Figure 2 is for operation at or near the highest voltage output possible for the rectifier; Figure 3 at the lowest voltage possible for this circuit. In 2a and 3a the voltages of the three phases 12, 13 and 14 are shown. The direct voltage produced by the rectifier is shown in 2b and 3b. The currents flowing in the three phases of the transformer, commutating reactor, and contacts of the rectifier are shown in 2c and 3c. The magnetic flux in the cores of the commutating reactors of the mechanical rectifier inserted into the three phases are shown in 2d, 2e, 2f and 3d, 3e, 3f. The Figure 2 and the Figure 3 on the bottom show a common time scale in which important time moments have been designated by time numbers which are the same for the same event in both figures.

Voltage control of the rectifier is accomplished by an increasing make step of the commutating reactor which prevents the rise of current. In Figure 2, the make step lasts from $t_0$ until $t_1$ and in Figure 3 also, except for this time now is much longer. Corresponding to this time there is a small increase in flux F–24 in 2d and a large increase in flux F–24 in Figure 3d. The increase in flux is equivalent to a voltage applied during a certain time. This voltage is missing in the diagram of the D.-C. output voltage of the rectifier as a triangle which is shaded in these figures. The average voltage produced by the rectifier is shown by a dotted line in 2b and 3b. The latter is only about two-thirds of the first one. Intermediate voltage values are possible by a lesser make strip, i. e. a lesser amount of flux which has to be changed before the current can rise.

Figures 2A, 2B, 2C, 2D, 2E, 2F:
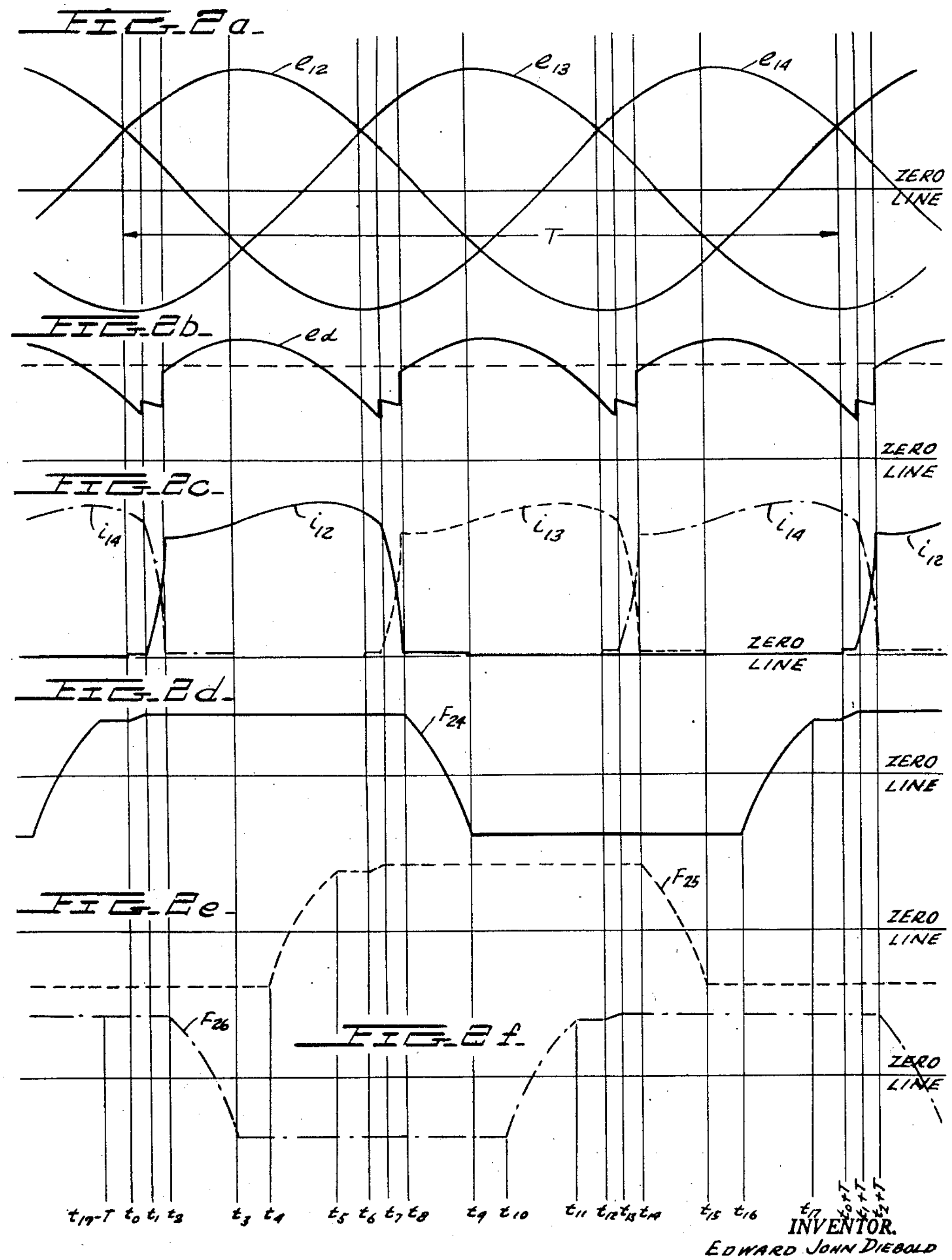
Figures 2a and 3a are voltage curves of the supply voltage.
Figures 2b and 3b illustrate the direct voltage produced by the rectifier.
Figures 2c and 3c show the current flow in each phase through the contacts.
Figures 2d, 2e, 2f and 3d, 3e, 3f show the flux in the core of the commutating reactor.

The most notable difference between the two figures is the flux change occurring between the times $t_{16}$ and $t_{17}$ in Figure 2d which has no corresponding flux change in Figure 3. This flux change is to be accomplished by the control circuit to be described in this disclosure. If no flux change is accomplished by means of the control circuit, only an operation according to Figure 3 is possible; i. e. an operation at very low output voltage and low power factor. An operation according to Figure 2 or any intermediate operation between the two figures requires a greater or lesser degree of flux change in the interval $t_{16}$ to $t_{17}$ which cannot be accomplished by the means provided in the circuit Figure 1.

When the contact carries current at the time $t_1$ and until the time $t_8$, the commutating reactor core 24 is saturated; it unsaturates only at the time $t_8$. During its desaturation, which lasts from $t_8$ until to $t_9$, the flux is again completely reversed to its negative maximum value, at which it rests from $t_9$ until $t_{16}$ in Figure 2 and until $t_0+T$ Figure 3. The flux change into the negative, occurring between the times $t_8$ and $t_9$ is the break step, which provides a low current step for the opening of the contact. During this break step a sufficient amount of break pre-excitation must be provided which was described in my copending application Serial No. 423,357 filed April 15, 1954.

The shape and the operation of the rectifier as described on Figures 2 and 3 is described in detail in my copending application.

The problem is simply to provide a sufficient amount of flux reversal to control the output voltage of the rectifier. The flux reversal is accomplished by sending currents through the windings 30, 31 and 32 of the commutating reactors shown in Figure 1. These currents must last from the time $t_{16}$ until $t_{17}$, have sufficient magnitude to reverse the flux, and be absolutely zero, or small enough to be neglected, during all the times of the cycle. Flux reversed in the three phases must be equal and constant for a certain desired regulation. Control must be stable, smooth and reproducible.

The principle of the solution is: A saturable reactor or transductor circuit in series with the commutating reactor, the transductor holds the current in the circuit practically to zero for the time it is not saturated, and provides a free rising current whenever the transductor is saturated.

Figure 5:
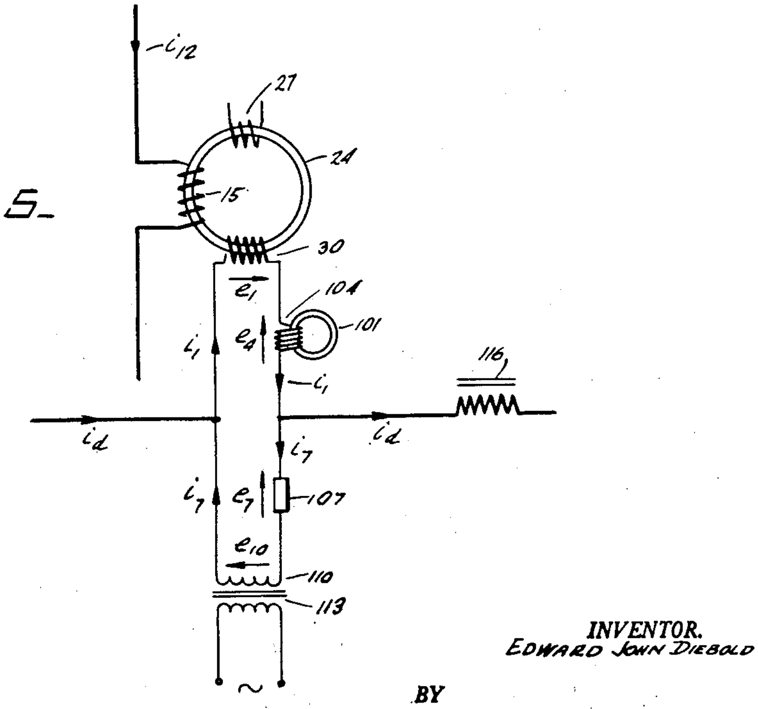
Figure 5 is a circuit diagram illustrating my novel flux reversal circuit for a mechanical rectifier.

Besides the commutating reactor in which the flux must be reversed, the transductor which holds the flux reversal current to zero whenever we don't want to have it, there are two more circuit elements necessary, one is a source of voltage, and the other one is a current limiting element. For the times that transductor and commutating reactor are saturated, this holds the current within finite limits. This circuit is shown in Figure 5.

Figures 8, 9, 10:
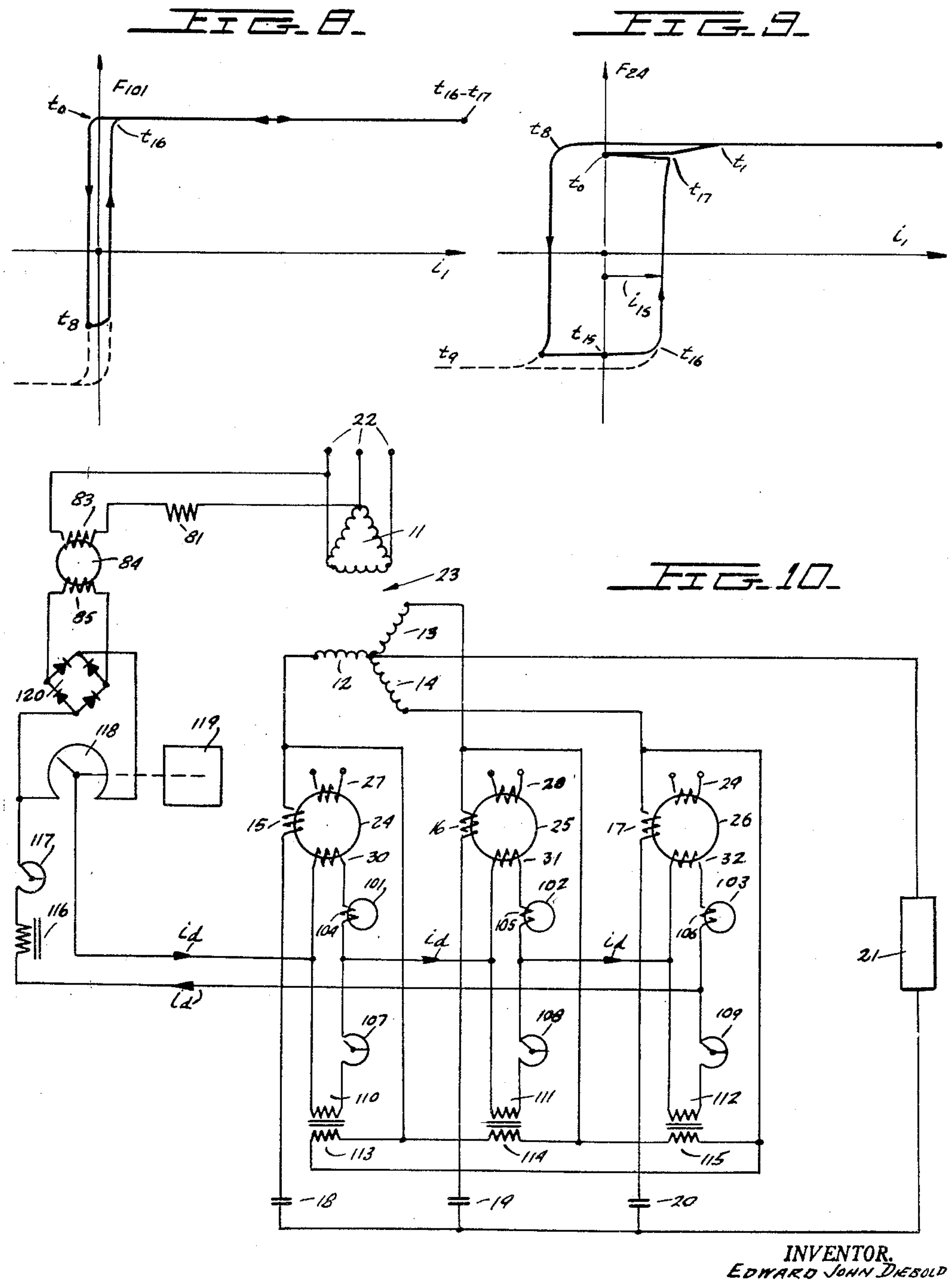
Figure 8 illustrates the magnetizing curve of the saturable reactor.
Figure 9 illustrates the magnetizing curve of the commutating reactor.
Figure 10 is a circuit diagram of my flux reversal circuit applied to a three phase rectifier.
Figure 11:
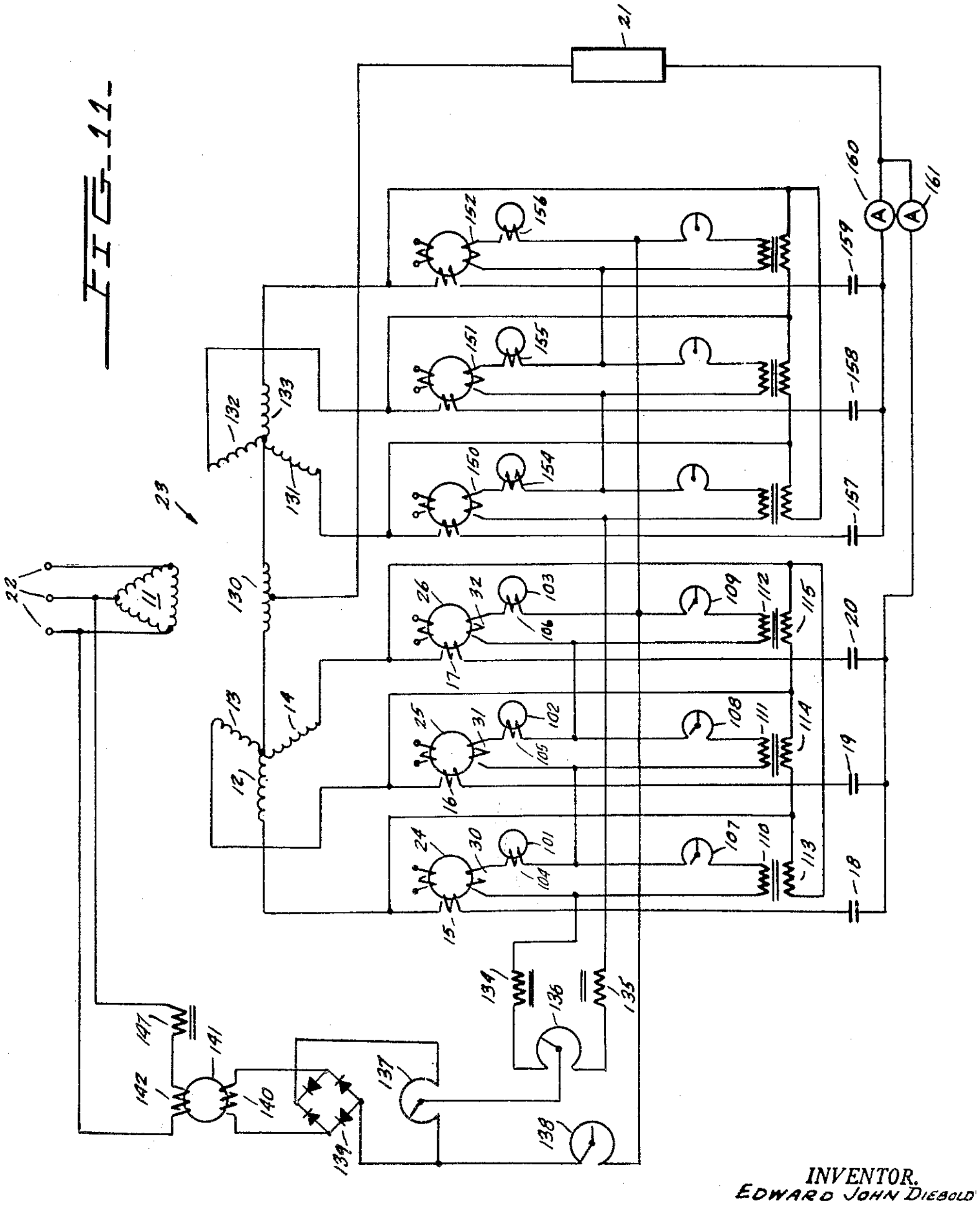
Figure 11 shows a circuit diagram of a six contact mechanical rectifier with voltage control by flux reversal.

Commutating reactor core 24, coil 15, pre-excitation winding 27, and flux reversal winding 30 are the same as shown in the circuit of Figure 1. The pre-excitation circuit connected to winding 27, is shown in copending applicaiton Serial No. 423,357, filed April 15, 1954. The terminals of winding 30 are connected on one side to the transformer winding 110, the other end is connected to the transductor winding 104 which in turn is connected to the resistor 107 and the other terminal of the transformer winding 110. The primary 113 of the transformer is connected to an A.-C. source which is shown in Figures 10 and 11. Besides this A.-C. circuit there is also a D.-C. current $i_d$, fed into the commutating reactor flux reversal winding, and taken off the common point, between transductor and resistor. This D.-C. circuit has a choke 116 to prevent A.-C. current from flowing through it.

The operation principle of this circuit can be described as follows:

*Direct current.*—Since the flux reversal winding 30 and the transductor winding 104 have practically no ohmic resistance, and the branch made of the winding 110 and the resistor 107 has an appreciable resistance, the direct current flows almost entirely through the branch 30, 104 and not through the branch 110, 107. Practically, the resistance of the resistor 107 indicated as R is rated at least twenty times larger than the ohmic resistance of the copper windings 30 and 104.

*A.-C. circuit.*—The choke 116 in the D.-C. circuit is made large enough to prevent an appreciable A.-C. current to flow through it. The A.-C. current, therefore, flows entirely through the closed loop 110, 30, 104, 107. The A.-C. voltage $e_{10}$, generated in the winding 110 appears as the sum of the voltages in the winding 30, 104 and 107.

These simple relationships are expressed mathematically in the equations of Figure 4. Equation 1 means that the sum of the outside induced voltages $e_{10}$ and $e_1$ is equal to the counter-electromotive forces within the circuit, $e_4$ and $e_7$.

Equation 2 shows that the current $i_1$ through the commutating reactor and transductor is actually the sum of the direct current $i_d$ and alternating current $i_7$. This alternating current $i_7$ is proportional to voltage $e_7$ across the resistor 107 (Equation 3).

Equation 4 shows Equation 1 integrated over one full cycle. Equation 5 indicates that the three first terms of Equation 4 are equal to zero. This obviously must be the case, since the voltages on the transformer, on the commutating reactor, and on the transductor are voltages induced by magnetic fields. Since the magnetic field over one cycle cannot either increase or decrease altogether, but must come back to its original value, the integral of this voltage over the cycle must be zero, because it is equal to the difference of the flux at the end of the cycle minus the flux at the beginning of the cycle as shown in Equation 5. Introducing the results of Equation 5 in Equation 4 gives Equation 6, indicating that the integral of the voltage across the resistor, over one full cycle, must also be equal to zero. With Equation 3 this gives the Equation 7: The integral of the alternating current against time over one full cycle equals zero, or the current $i_7$ is a true alternating current.

Taking advantage now of the previously mentioned properties of the transductor, we can analyze the currents and voltages in the circuit by separating the whole cycle into two intervals, one interval U and another interval S. The first one being when the transductor is unsaturated and the second one when the transductor is saturated.

*Interval U.*—The core 101 of the transductor is not saturated, the voltage $e_4$ across the coil 104 can be very high, the current $i_1$ is practically equal to zero as shown by Equation 8. Inserting Equation 8 into Equation 2 we obtain the Equation 9, which means that for the interval U the A.-C. current $i_7$ is equal to the opposite value of the direct current $i_d$, or the direct current flows through the transformer 110 and resistor 107, against their normal direction of current.

The interval U is the very long interval during which the current in the flux reversal must be zero. At the beginning of this interval and at the end of the interval is the interval S, during which the transductor is saturated. Before the interval U starts and after the interval U ends, the transductor is saturated, and always in the same direction, as it is saturated only once during the cycle.

Since the total flux change in the transductor over the interval U is zero, i. e. the flux changes from the saturated value back to saturated value through an unsaturated part; the voltage time integral of the transductor volage $e_4$ must follow the Equation 10, which means that the voltage time area described by the transductor voltage over the full interval U is equal to zero.

Since during the interval U, the alternating current $i_7$ is equal and opposite to the direct current $i_d$, the quantity of charge flowing through the circuit is given by Equation 11. This quantity of charge passing during the interval U must be reversed again during the interval S, according to Equation 7 because the total quantity of charge displaced during one full cycle in the A.-C. circuit must be equal to zero.

*Interval S.*—The transductor is saturated, the voltage across the transductor can be neglected as shown by Equation 12. The sum of the voltages then comes to the very simple Equation 13 i. e. the resistor 107 takes the sum of the induced voltages of the transformer 110 and the commutating reactor winding 30.

Equation 13 and Equation 3 give Equation 14. The main current $i_1$ is called $i_{1s}$ during interval S as shown in Equation 15. It appears in Figure 9 as the magnetizing current of the commutating reactor. Equation 2 then becomes Equation 16 and the integration thereof Equation 17. The charge transported into the circuit during the interval S is given by this equation.

Summing up the currents during the total cycle can be done on Equation 18 which is modified by the use of Equations 11 and 17 shown as a very simple result in Equations 19 and 20. The current pulse furnished by the flux reversal circuit into the commutating reactor from the time $t_{16}$ until the end of the cycle is equal to the average direct current furnished by the D.-C. circuit, times the duration of the cycle. The meaning of this equation is also shown in the following figures.

It was explained in Figure 2 how the flux in the commutating reactor F–24 had to be reversed a short time prior to the end of the cycle, this is accomplished by means of the transductor circuit and shown in Figure 6.

Figures 6A, 6B, 6C, 6D:
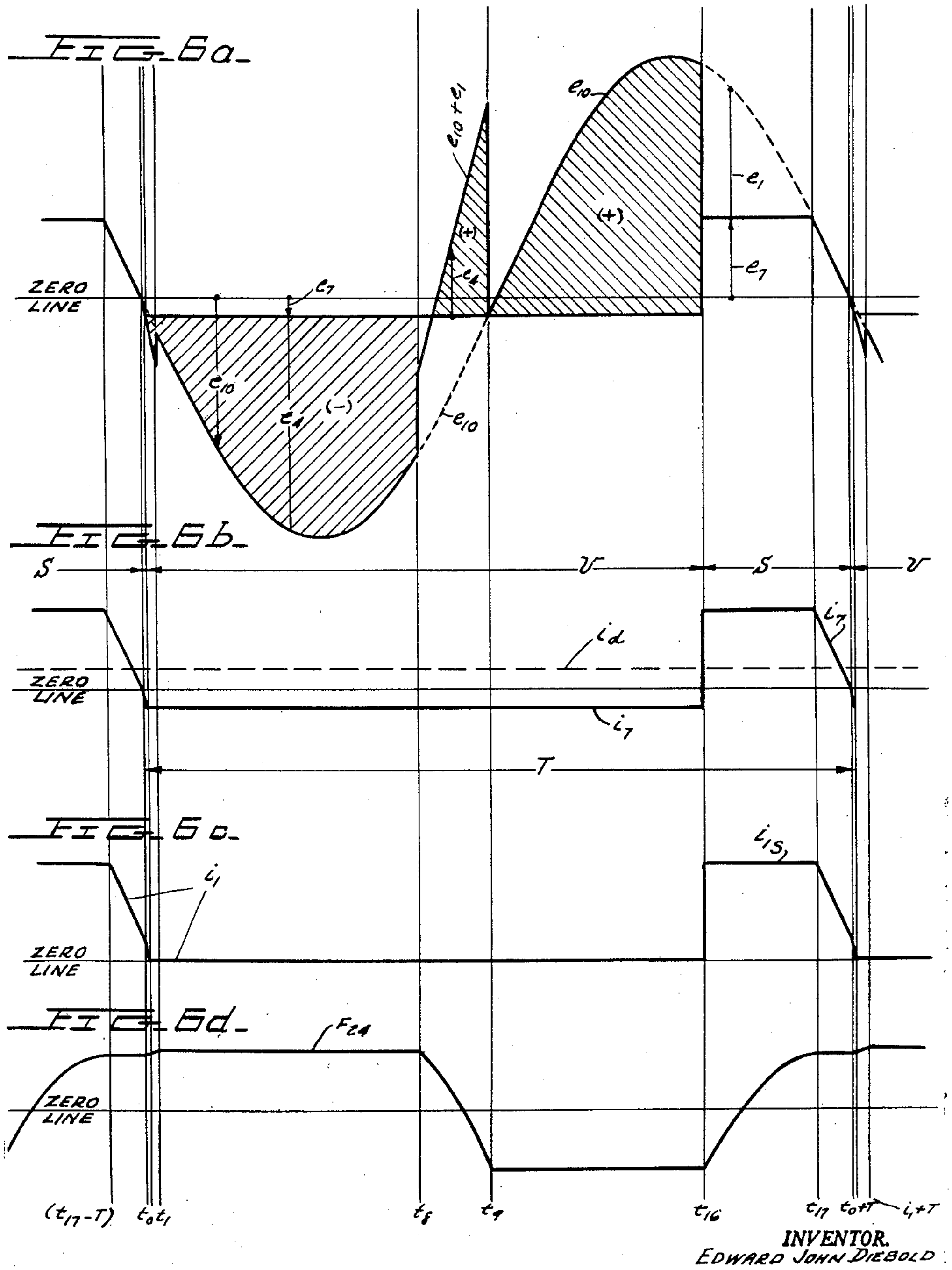
Figure 6a shows the voltages within the saturable reactor.
Figure 6b shows the current flow in the saturable reactor circuit.
Figure 6c illustrates the current through the commutating reactor.
Figure 6d shows the flux conditions in the saturable reactor circuit.

Figure 6*a* shows the voltages in the transductor circuit. $e_{10}$ is the voltage induced by the transformer winding 110. $e_1$ is the voltage induced in the winding 30 on the commutating reactor core 24. The voltage on the transformer is a pure sine wave, the voltage on the commutating reactor is discontinuous, which means that it starts suddenly and disappears suddenly. A time scale on the bottom of Figure 6, identical with the time scale on the bottom of Figure 2, permits to correlate these two figures. The flux F–24 in the commutating reactor, shown in Figure 2*d*, is repeated in Figure 6*d*. At the start of the cycle, the flux changes very slightly between the time $t_0$ and $t_1$. This is shown as a small shaded area in Figure 2*b* and as a small triangular shaded area in Figure 6*a*, disappearing suddenly at the time $t_1$. At the time $t_8$ the break step starts, which is apparent from the shape of the flux F–24 in these two figures, and also on the sudden jump of voltage in Figure 6*a*. This voltage stays on till the time $t_9$, then it disappears again, because the core of the commutating reactor is saturated. The flux F–24 remains at its negative maximum value until the time $t_{16}$, when it is reversed partially, this reversal is accomplished by the transductor circuit and shown on Figure 6, whereas Figure 2 shows the change of flux without giving the reason why.

Concerning the Figure 6*a*, the voltage Equations 1, 3 and 13 are plotted graphically in this figure. During the interval U the voltage $e_1$ of the commutating reactor is zero for most of the time and therefore the transformer voltage $e_{10}$ must be equal to the sum of the voltages $e_4$ plus $e_7$. Since the resistor voltage $e_7$ is constant, the transductor voltage $e_4$ is variable. At the beginning of the interval U, the transductor voltage is positive. According to Equation 10 the time integral of the voltage over this interval must be equal to zero, which is shown in Figure 6*a* as negative and positive areas which must be equal.

The interval U ends suddenly when the transductor is saturated in the positive direction, when its flux has been changed back to the initial value at the beginning of the cycle. This change of flux is shown in Figure 2. At the time $t_0$ the transductor is still saturated from the previous cycle, it will increase its flux until the time $t_8$ and then again the flux will decrease until it has reached saturation value at the time $t_{16}$, now the transductor is saturated again, because the flux has been changed back due to the voltage time area positive being equal to the voltage time area negative, hence, the transductor current $i_1$ can rise freely and the interval S starts.

During this interval the voltage of the transductor $e_4$ is zero, the voltage equation changes to Equation 13. The resistor voltage $e_7$ is equal to the transformer voltage plus the voltage of the commutating reactor.

Regarding the voltage on the resistors it can be seen in Figure 6*c* that the current through the commutating reactor $i_1$ is held practically constant during most of the interval S. This is due to the magnetizing current of the commutating reactor which is approximately constant, as shown on Figure 9, there the current $i_{1s}$ denotes the current through the commutating reactor during the interval S. This current being limited by the commutating reactor, and the direct current being invariable, we have, according to Equation 16, that the current through the resistor also is constant, equal to the difference of the two other currents. Since the voltage $e_7$ on the resistor is given by Equation 3 it is also constant. The only voltage which can fully compensate for the impressed voltage $e_{10}$ of the transformer, must be the voltage $e_1$ on the commutating reactor winding 30. This voltage $e_1$ is shown between the dotted line and the full line in interval S in Figure 6*a*. This voltage reverses the flux of the commutating reactor, as shown in Figure 6*d*, because any voltage appearing on the commutating reactor, no matter in which winding, will cause the flux to change. At the time $t_{17}$, the transformer voltage reaches the resistor voltage, and the commutating reactor voltage disappears. The flux reversal therefore is terminated. Depending on the length of interval between the time $t_{16}$ and $t_{17}$, flux reversal will be more or less. The current in the commutating reactor now returns to zero and remains at zero during the whole interval U.

Figure 6*d* shows the alternating current $i_7$ in the transductor circuit, according to Equation 9 this current must be equal and opposite to the direct current during the whole interval U. The current is positive during the interval S according to the Figure 6*a*, since the alternating current is proportional to the alternating voltage. The alternating current $i_7$ and the alternating voltage $e_7$ consist of a long low negative pulse and a short high positive pulse. The combination of alternating currents $i_7$ and the direct current $i_d$ gives the pulse current shown in Figure 6*c*, which is the current $i_1$ flowing through the flux reversal winding 30 on the commutating reactor. This current is a uni-directional current, the average value of which is given by Equation 20. Since the height of this pulse is given by the magnetizing current of the commutating reactor, a change of the direct current $i_d$ will only change the length of this pulse. If the current $i_d$ is increased, this pulse will get shorter. The flux reversal accomplished in the commutating reactor is proportional to the voltage time area between the dotted line and the full line in Figure 6*a*, in the time interval $t_{16}$ to $t_{17}$. By changing the amount of direct current $i_d$, therefore, the length of this interval is changed and with it the area, which means that we change the amount of flux reversed. It is by this means that flux reversal controlled by a direct current $i_d$ is accomplished.

Figures 3A, 3B, 3C, 3D, 3E, 3F:
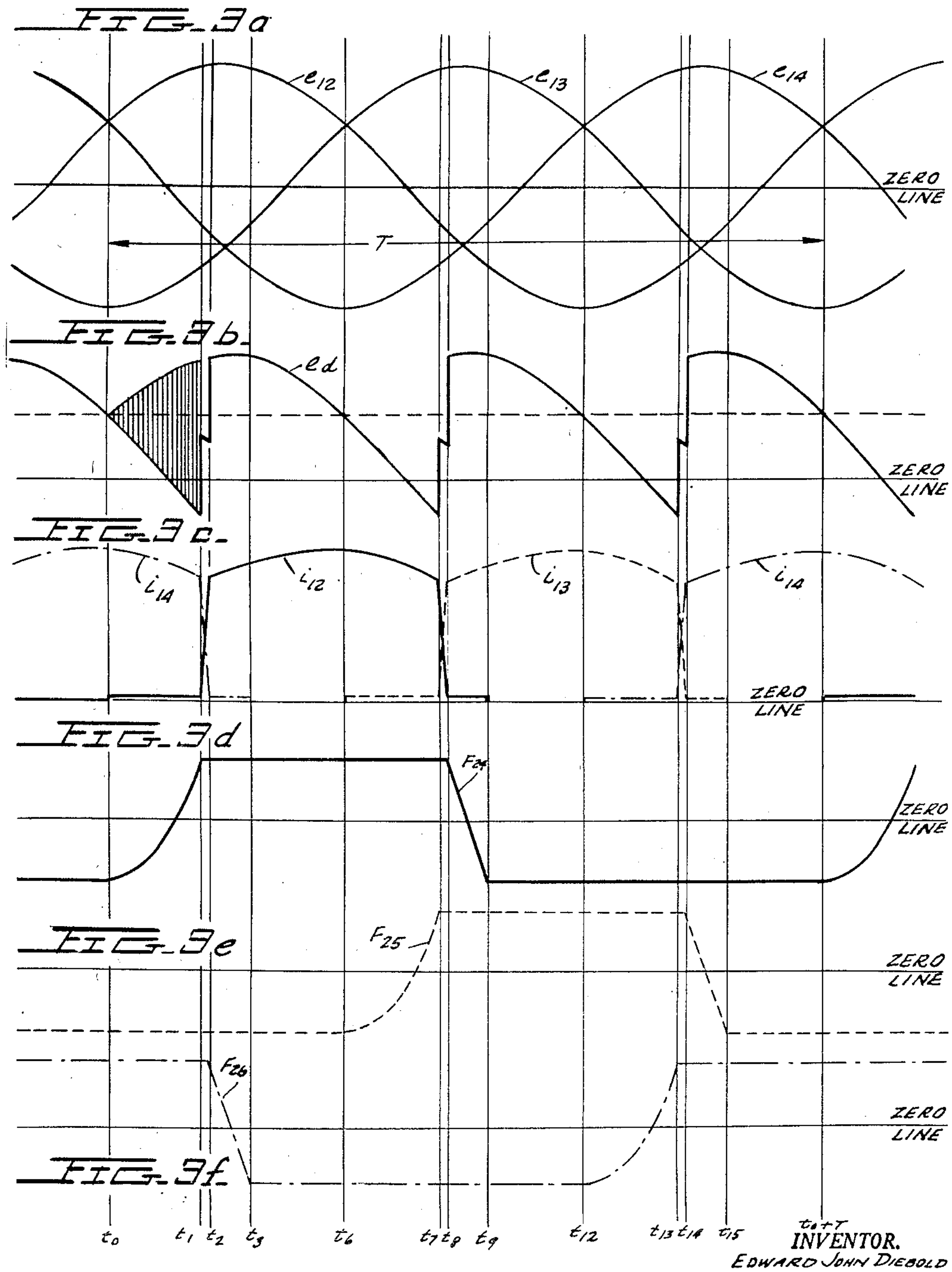
Figures 7A, 7B, 7C, 7D:
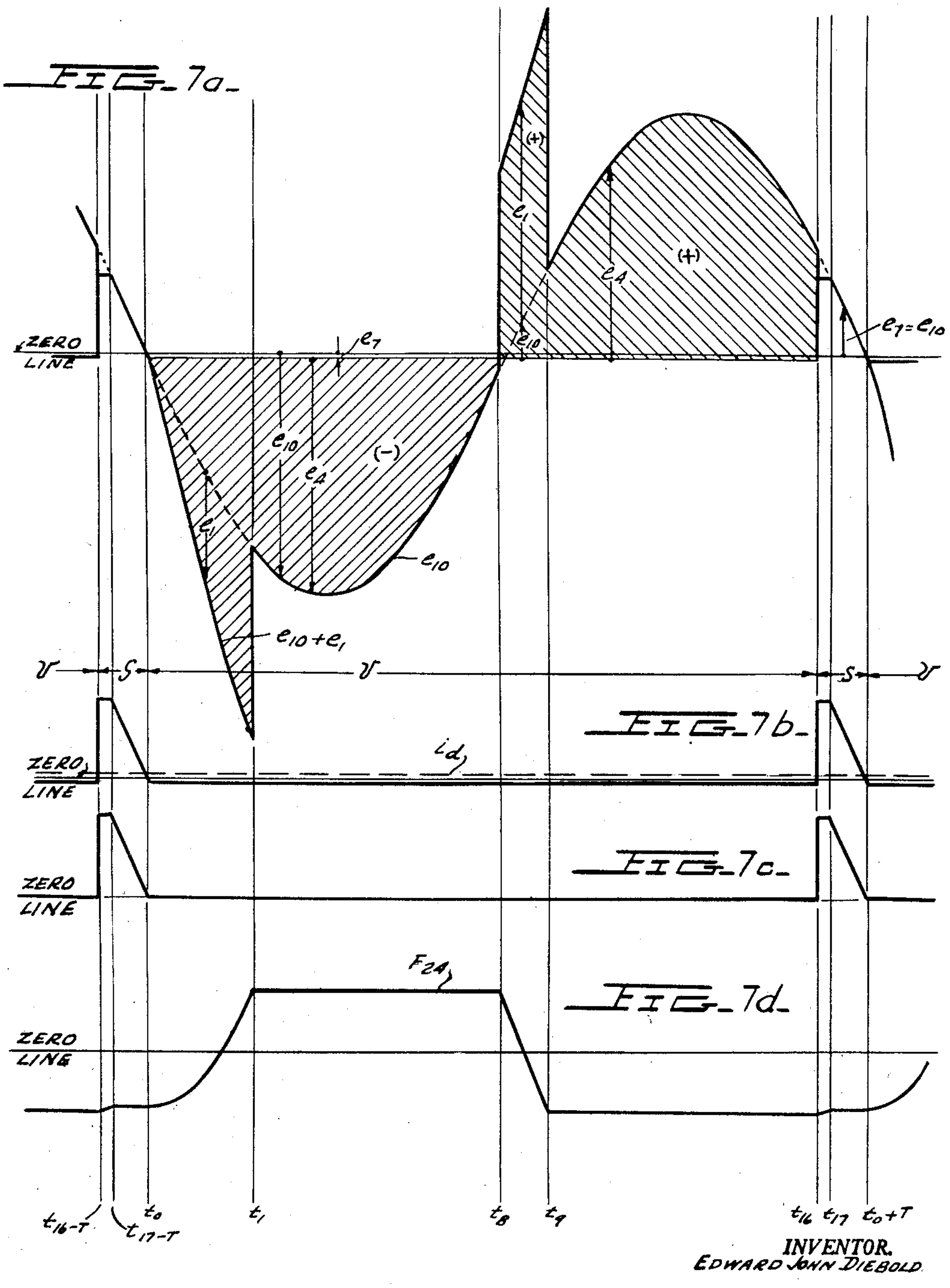
Figure 7 illustrates the conditions of the rectifier when no flux reversal is used.

The operation of the transductor circuit when almost no flux reversal issued is shown in Figure 7 which must be compared with Figure 3. Having only a very small direct current, the average value of the direct current is very low. Hence, according to Equation 20 the average value of the pulse also is very low. The height of the current pulse in Figure 7*c* being unaffected, this current pulse must become very short. Hence the time of the current interval S is very short also, and the amount of flux reversed in the commutating reactor is almost nil (the small triangular area above the pulse). In Figure 7 a very small amount of flux is reversed, leaving the remainder of the flux reversal to be done during the make step, which happens between the times $t_0$ and $t_1$. This appears as a large voltage pulse in the interval $t_0$ to $t_1$ in Figure 7*a* as the voltage $e_1$. This same voltage area is shown in Figure 3*b*, as a shaded area, causing a major voltage drop of the rectifier, reducing the average voltage output. By the simple expedient therefore, of reducing the small current $i_d$ almost to zero, the output voltage of the rectifier thus is changed.

In practical rectifiers where this means of voltage control is used, the amount of power required to control this small direct current $i_d$ is approximately one-thirty thousandths of the output power of the rectifier. The pairs of Figures 2–6 and 3–7, combined with the equations shown on Figure 4, should sufficiently describe the operation of the transductor flux reversal circuit.

Figure 8 shows the magnetizing curve of the transductor. $F_{101}$ is the flux in the core 101 and $i_1$ the current through the coil 104 of the transductor, the time is indicated by $t_0$ through $t_{16}$. At the beginning of the cycle, as shown in Figures 6*a* and 7*a*, the transductor is first magnetized in the negative direction by the large area indicated as negative and right hand shading in Figure 6*a*. Negative magnetization is terminated at a time very shortly after $t_8$, from then on the positive magnetization starts; indicated as left hand shading in Figure 6*a*. Positive magnetization proceeds until the time of $t_{10}$, then the transductor core is again saturated. From $t_{16}$ until the time $t_0$, the transductor remains saturated in the positive direction. Indicated by the dotted line in Figure 8, the transductor is never saturated in the negative direction, i. e. its iron core is made large enough to absorb the full voltage existing in the circuit. The current through the transductor shown as $i_1$ in Figure 6*c* remains practically constant in the interval $t$ to $t$ which is also shown by a point on the extreme right of Figure 8.

Figure 9 shows the magnetizing curve of the commutating reactor corresponding to the operation in Figure 2 and Figure 6. At the time $t_0$ the commutating reactor is almost completely saturated in the forward direction, this is accomplished at the time $t_1$ when the current rises to a very high value, which it keeps from the time $t_2$ until the time $t_7$. From the time $t_7$ to the time $t_8$, current falls back to zero and becomes negative (which must be compensated for by the break preexcitation). From the time $t_8$ until the time $t_9$, the flux is changed from positive saturation to almost negative saturation which is the break step. The flux then remains constant until the time $t_{15}$.

At the time $t_{16}$ the flux reversal starts, as shown by the current in Figure 6*c* and the flux in 6*d*. The constant current flowing is equivalent to the right hand side of the loop, shown in Figure 9, and the amount of flux change is caused by the amount of the voltage under the dotted line in Figure 6*a*. At the time $t_{17}$ the flux is reversed sufficiently and the flux reversal current drops back to zero at the time $t_0$.

The flux reversal circuit has been described for one phase according to Figure 5. Using the same circuit three times, and inserting it in Figure 1 we obtain Figure 10. This Figure 1 has again the same transformer 23, the same A.-C. source 22, and the same commutating reactors 24, 25, 26. Now the flux reversal current windings 31 and 32 are provided each with one transductor circuit, consisting of the transductors 101, 102, 103, with the windings 104, 105, 106, the rheostats 107, 108, 109 which take the place of the fixed resistor 107 in Figure 5. The voltages are supplied by the single-phase transformers 110, 111 and 112 with the primaries 113, 114 and 115. These are connected in the proper phasing to the A.-C. output of the transformer 23. The connection of these A.-C. windings is made to obtain the same phase-distribution as shown in Figures 6 and 7. If a different phase position is desired or necessary, it can be obtained by the use of a small phase-shifter transformer, since the A.-C. power needed for the pre-excitation circuit is very small.

For the direct current $i_d$, the three transductor circuits are connected in series. This direct current is supplied from the primary power of the transformer 23 through the choke 81 and the constant voltage transformer 84, with the primary winding 83 and the secondary winding 85. This constant voltage transformer has been described previously in my application Serial No. 312,053, filed September 29, 1952 (C–226). The voltage of the constant voltage transformer is rectified in the bridge type rectifier 120, giving a constant D.-C. potential. A rheostat 118 is driven by the regulator 119, and gives a variable direct current $i_d$ for the flux reversal control. Hand adjustment is provided by the hand rheostat 117. The direct current is maintained constant by the choke 116. In practical rectifiers, the regulator 119 is usually controlled by a current transformer to provide constant current output regulation of the rectifier.

Instead of using a constant voltage transformer and a regulator operated rheostat to regulate the control current $i_d$ of the flux reversal circuit, it is also possible to take a magnetic amplifier or another type amplifier circuit. Connecting this amplifier as a regulator, to regulate the output voltage of the rectifier, according to a program which requires a constant voltage, a constant current, or constant power of the mechanical rectifier.

Compared with the previously used mechanical voltage control of the mechanical rectifier, the method described herewith is purely electrical and can be adapted to a more complex control system, providing for automatic control of the output of a mechanical rectifier according to a predetermined program, using cross compounding, or with an almost instantaneous response.

Figure 11 shows the circuit diagram of a six contact mechanical rectifier with voltage control by flux reversal. The transformer 23 has a delta connected primary 11, a secondary winding 12, 13 and 14 star connected, and another secondary winding 131, 132, 133 with opposite star connection. An interphase transformer 130 balances the harmonic ripple output of the two valves of the rectifier. This rectifier has now six commutating reactors, connected in series with six contacts, each commutating reactor has a transductor flux reversal circuit as described in Figure 10.

Usually the output of the two halves of a mechanical rectifier is not exactly balanced, because of the harmonic content of the primary A.-C. supply which is also rectified, and either adds or subtracts to the two halves of the load. This means that one side of the rectifier has a higher voltage and the other side has a lower voltage and thus the output of current is unbalanced. Connecting two transductors in series with another choke 135 and balancing their supply by a hand adjusting rheostat 136, it is easily possible to balance out the voltages and therefore the currents of the two halves of the mechanical rectifiers. If for example the rectifier consisting of the contacts 19, 18, 20 has a higher voltage than the rectifier consisting of the contacts 157, 158, and 159, the current measured by the amperemeter 161 will be higher than the current measured by the amperemeter 160. Turning the rheostat 136 in such a way as to increase the resistance in the circuit through the choke 134 and decrease the resistance in the circuit through choke 135 will decrease the current in the first three transductors and increase the current in the second three transductors, reducing the voltage output of the first three contacts and increasing the output of the second three contacts. It is thus possible to balance out the load division between the two halves of the mechanical rectifier. If the voltage supplied by the primary line 22 has a variable content of harmonics, this balance changes rapidly and constantly, it is advisable to use two regulators, or then to make the regulation of rheostat 136 automatic. The circuit in Figure 11 is only schematic and many variations are possible. The application of magnetic amplifiers to feed the direct current through those circuits is preferred. In case of magnetic amplifiers it is possible to regulate the output of a multiple rectifier in such a way to have each part of the rectifier give exactly the same amount of direct current output.

The load balancing means herein described is not possible with mechanical rectifiers made as before with a mechanical voltage control. Sometimes this led to load unbalancing of up to 30% between the two halves of the rectifier, i. e. having one half overloaded and the other half underloaded. If the load is unbalanced between the phases of a three-phase system, these unbalances can be adjusted by means of the rheostats 107, 108, 109 particularly if the quality of the iron in the commutating reactor cores is not equal.

A mechanical rectifier having a circuit flux reversal circuit was investigated with a cathode ray oscilloscope running different conditions of voltage. The following figures were taken directly from the oscilloscope.

Figure 12:
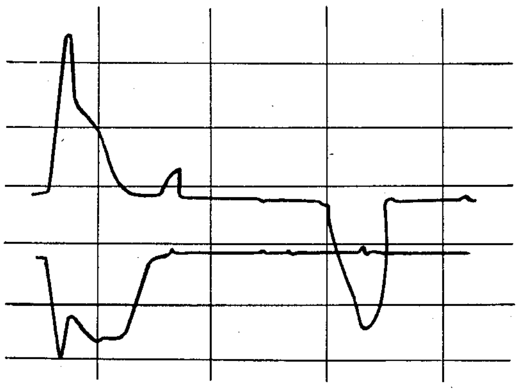
Figures 12–20 illustrate oscillograms of a mechanical rectifier with flux reversal.

Figure 12 shows on the top the voltage across the commutating reactor, taken over one full cycle and on the bottom the current through the flux reversal winding of the commutating reactor, taken at the same time base, in a dual beam oscilloscope. The upper trance shows first at the left hand side the high voltage induced in the commutating reactor by the flux reversal, it is due to the flux reversal current shown on the lower trace. The voltage and current wave shapes correspond to Figure 6 except that the voltage shown in Figure 6 as $e_1$ is superposed to the sine wave of the flux reversal circuit, whereas Figure 12 shows it in its full shape. The part of the left of the curve corresponds to the time interval $t_{16}$ to $t_{17}$, where the voltage across the commutating reactor is a short part of a sine wave which in reality is distorted by harmonic voltages, and the current corresponds to Figure 6*c* except that it is reversed in direction. The small voltage pulse after the flux reversal, is the voltage appearing on the commutating reactor during the make step, which is very short, because most of the flux was reversed during the flux reversal and little is left over for the make. Approximately 120° later the break step occurs, it is in the opposite direction and shows the point where the contact interrupts as a small gap in the curve. A small make step is also shown on Figure 2*b* as a small shaded area on the left hand side, whereas the break step corresponds to the voltage difference between $e_{13}$ and $e_{12}$ and time interval $t_8$ to $t_9$ in Figure 2*a*.

Figure 13:
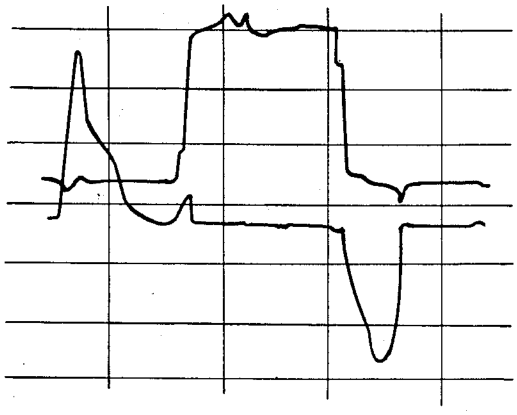
Figure 14:
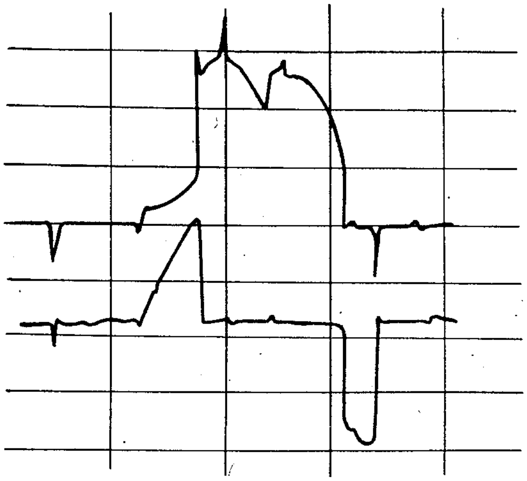

*Figure 13*.—The upper trace shows the current through the commutating reactor and the contact as compared to the voltage of the commutating reactor in the lower trace, which is the same as the upper trace in Figure 12. The current through the commutating reactor and contact is practically zero during the flux reversal, as it should be. The small distortion of the wave is probably due to pick up off the leads to the commutating reactor, and not actual current in the commutating reactor. The short make step is seen as a short hesitation of the rise of current in the upper trace and a pip in the lower trace. The current then remains constant for a certain time and finally decreases immediately before the break step, during which it is approximately zero. The small current interrupted at the break is hardly visible on this oscillogram. Since the rectifier carried only a very small current (approximately one quarter of a percent of the rated current), the actually interrupted current is insignificantly small. Figure 14 shows the same curves taken on the same rectifier but without flux reversal, that is when the rectifier operates at its lowest voltage. The large positive pulse of the flux reversal voltage in the lower trace is missing, there only remains a small bulge which is the residual flux reversal which is obtained with a low control current. The make step now is very long and the make step voltage rises in a triangular shape which corresponds to the shaded area in Figure 3*b*. At the end of the make step, the current rises to its full value, but it is less than in Figure 13, because now the output voltage of the rectifier is approximately 40% less than in the upper figure. The break step occurs again after the end of the current carrying period. It is shorter and higher because the voltage has been increased due to the delay in the make. Figures 13 and 14 are taken on the same rectifier under the same circumstances with the same pre-excitation current by only changing the very small control current in the flux reversal circuit, demonstrating the tremendous effect of this small current upon the rectifier. The control current in the actual case was approximately one half an ampere in Figure 13 and one twentieth an ampere in Figure 14. The output current of the rectifier would be ten thousand amperes in Figure 13 and six thousand amperes in Figure 14 if operating on resistive load. The voltage of the rectifier is 400 volts in Figure 13 and 240 volts in Figure 14. The control voltage is 36 volts.

Figure 15:
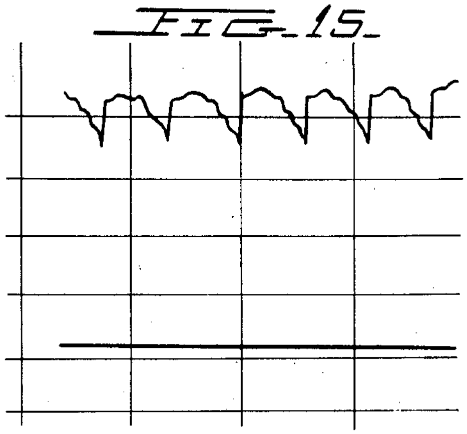
Figure 16:
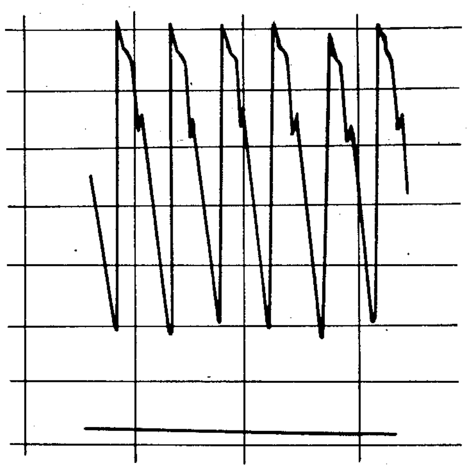

Figure 15 and Figure 16 show the voltage wave of the rectifier under the same conditions as Figure 13 and Figure 14. The straight line is the zero line of the voltage. Figure 15 shows the wave shape of the rectifier output voltage at high voltage, that is with large flux reversal and Figure 16 shows the wave shape of the rectifier low voltage that is without flux reversal. The voltage wave of Figure 15 corresponds to Figure 2*b* and the voltage wave of Figure 16 corresponds to Figure 3*b*. The difference in these waves is caused by the flux reversal only.

Figure 17:
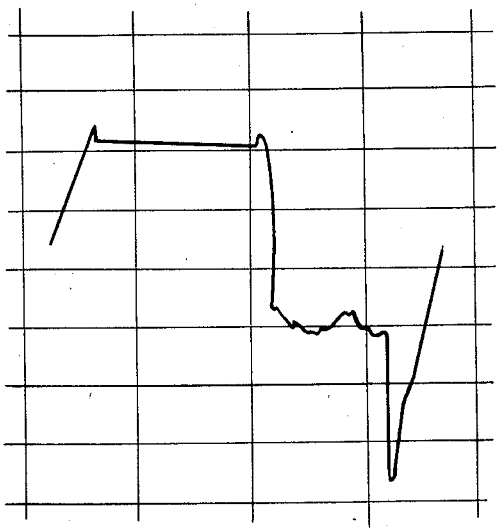
Figure 18:
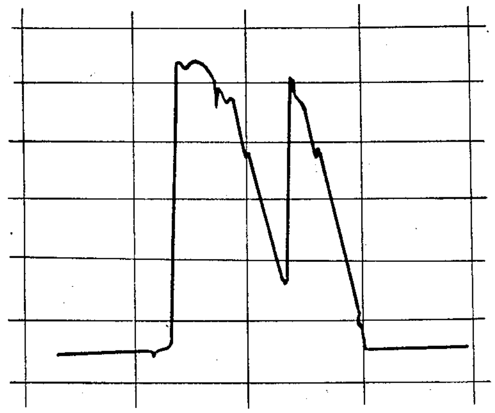

Figure 17 and Figure 18 show the voltage across the contact of the mechanical rectifier with flux reversal in Figure 17. That is the rectifier operating at a high voltage and without flux reversal in Figure 18. That is the rectifier operating at a low voltage. Figure 17 shows at the left hand side the make of the contact, that is the voltage rising slowly and slightly above zero until the contact closes. It then remains closed for a long time and opens within the break step, which keeps the recovery voltage across the contacts at a very low value, before it rises quickly into the reverse voltage of the rectifier. It then remains approximately constant until the flux reversal occurs at the right hand side of the figure, with the flux reversal voltage of the commutating reactor adding to the rectifier voltage. After this the voltage returns to the make at the left hand side of the picture.

Figure 18 shows the same figure without flux reversal, the only difference is that the figure is reversed with the reversed voltage of the rectifier plotted upwards instead of downwards and the make at the right hand side of the picture, and the break point at the left hand side of the picture. Starting at the right hand side the make occurs with a slightly negative voltage, the contact then remains closed until the trace returns to the left hand side of the picture to the break point. The break again occurs with practically no recovery voltage across the contact and at the end of the break step the voltage increases very rapidly into the negative direction. Since the voltage wave is distorted by having the voltage regulated down, there is a great variation of the inverse voltage. The high reverse voltage created by flux reversal in Figure 17 does not exist, the voltage returns normally to the make point.

Figure 19:
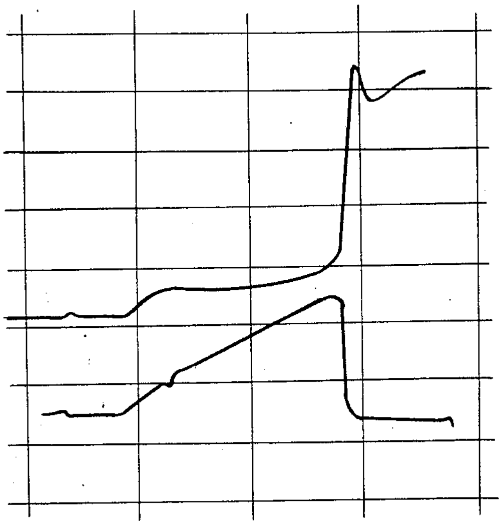
Figure 20:
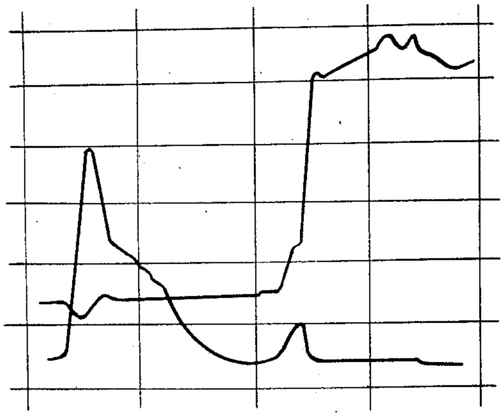

Figure 19 and Figure 20 show an extended picture of the voltage at the make, with the upper figure for low voltage output of the rectifier (that is low flux reversal) and the lower figure with voltage control of the rectifier by flux reversal. The upper trace in these figures is the current through the contact and the lower trace the voltage across the commutating reactor.

Figure 19, the current through the contact rises very slowly from the make point through the make step until at the end of the make step it rises quickly into the full current of the line. During this make step, the voltage appears across the commutating reactor as shown in the lower trace. Figure 20, in the upper trace the current through the contact is zero before the make, rises shortly to the value of the make step, remains there for a short time and then increases at the end of the make step to the full value. The voltage across the commutating reactor again shows the high peak made by the flux reversal prior to the make step and then a low peak made by the voltage across the commutating reactor during the make step.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding and a flux reversal circuit therefor; said flux reversal circuit comprising said flux reversal winding, a saturable reactor, a direct current source and an alternating current source, said saturable reactor having a winding connected in a loop circuit with said flux reversal winding said alternating current source, said direct current source connected in series with said flux reversal winding and said saturable reactor winding.

2. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current and alternating current circuit which alternately aid and oppose to create a pulse energization for a flux reversal winding of said flux reversal circuit.

3. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a flux reversal winding connected in a loop circuit with a saturable reactor and an alternating current source, a direct current supply for said flux reversal winding and said saturable reactor, means to prevent the direct current from said direct current source from flowing in said alternating current source, means to prevent the alternating current from flowing in said direct current source.

4. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current source, an alternating current source, a saturable reactor, a flux reversal winding, a limiting resistor, and a choke; said flux reversal winding wound on the core of said commutating reactor, said saturable reactor having a winding connected in a loop circuit with said alternating current source, said limiting resistor and said flux reversal winding; said direct current source connected in a closed circuit with said flux reversal winding, said winding of said saturable reactor and said choke; said limiting resistor preventing direct current flow through said alternating current source, said choke preventing alternating current flow through said direct current source, said flux reversal having no current flow therethrough when said saturable reactor is unsaturated.

5. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current source, an alternating current source, a saturable reactor, and a flux reversal winding, said flux reversal winding wound on the core of said commutating reactor, said saturable reactor having a winding connected in a loop circuit with said alternating current source, and said flux reversal winding; said direct current source connected in a closed circuit with said flux reversal winding and said winding of said saturable reactor; said flux reversal having no current flow there through when said saturable reactor is unsaturated.

6. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current source, an alternating current source, a saturable reactor, a flux reversal winding, and a choke; said flux reversal winding wound on the core of said commutating reactor, said saturable reactor having a winding connected in a loop circuit with said alternating current source and said flux reversal winding; said direct current source connected in a closed circuit with said flux reversal winding, said winding of said saturable reactor and said choke, said choke preventing alternating current flow through said direct current source, said flux reversal having no current flow there through when said saturable reactor is unsaturated.

7. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current source, an alternating current source, a saturable reactor, a flux reversal winding, a limiting resistor, said flux reversal winding wound on the core of said commutating reactor, said saturable reactor having a winding connected in a loop circuit with said alternating current source, said limiting resistor and said flux reversal winding; said direct current source connected in a closed circuit with said flux reversal winding, said winding of said saturable reactor, said limiting resistor preventing direct current flow through said alternating current source, said flux reversal having no current flow there through when said saturable reactor is unsaturated.

8. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit, said flux reversal circuit comprising a direct current source, an alternating current source, a saturable reactor, a flux reversal winding, a limiting resistor, said flux reversal winding wound on the core of said commutating reactor, said saturable reactor having a winding connected in a loop circuit with said alternating current source, said limiting resistor and said flux reversal winding; said direct current source connected in a closed circuit with said flux reversal winding, said winding of said saturable reactor, said limiting resistor preventing direct current flow through said alternating current source.

9. A mechanical rectifier comprising a commutating reactor and a flux reversal circuit; said flux reversal circuit comprising a direct current source, an alternating current source, a saturable reactor, a flux reversal winding, and a choke; said flux reversal winding wound on the core of said commutating reactor; said saturable reactor having a winding connected in a loop circuit with said alternating current source and said flux reversal winding; said direct current source connected in a closed circuit with said flux reversal winding and said winding of said saturable reactor and said choke; said choke preventing alternating current flow through said direct current source; said flux reversal having no current flow therethrough when said saturable reactor is unsaturated; said direct current source comprising a bridge type rectifier connected to a main alternating current source through a constant voltage transformer and an auxiliary choke.

10. A mechanical rectifier comprising a commutating reactor and a flux reversal circuit; said flux reversal circuit comprising a direct current source, an alternating current source, a saturable reactor, a flux reversal winding, and a choke; said flux reversal winding wound on the core of said commutating reactor; said saturable reactor having a winding connected in a loop circuit with said alternating current source and said flux reversal winding; said direct current source connected in a closed circuit with said flux reversal winding and said winding of said saturable reactor and said choke; said choke preventing alternating current flow through said direct current source; said flux reversal having no current flow therethrough when said saturable reactor is unsaturated; said direct current source comprising a bridge type rectifier connected to a main direct current source through a constant voltage transformer and an auxiliary choke; said bridge type rectifier connected to said flux reversal winding through a first rheostat.

11. A mechanical rectifier comprising a commutating reactor and a flux reversal circuit; said flux reversal circuit comprising a direct current source, an alternating current source, a saturable reactor, a flux reversal winding, and a choke; said flux reversal winding wound on the core of said commutating reactor; said saturable reactor having a winding connected in a loop circuit with said alternating current source and said flux reversal winding; said direct current source connected in a closed circuit with said flux reversal winding and said winding of said saturable reactor and said choke; said choke preventing alternating current flow through said direct current source; said flux reversal having no current flow therethrough when said saturable reactor is unsaturated; said direct current source comprising a bridge type rectifier connected to a main direct current source through a constant voltage transformer and an auxiliary choke; said bridge type rectifier connected to said flux reversal winding through a first rheostat; said first rheostat driven by a regulator.

12. A mechanical rectifier comprising a commutating reactor and a flux reversal circuit; said flux reversal circuit comprising a direct current source, an alternating current source, a saturable reactor, a flux reversal winding, and a choke; said flux reversal winding wound on the core of said commutating reactor; said saturable reactor having a winding connected in a loop circuit with said alternating current source and said flux reversal winding; said direct current source connected in a closed circuit with said flux reversal winding and said winding of said saturable reactor and said choke; said choke preventing alternating current flow through said direct current source; said flux reversal having no current flow therethrough when said saturable reactor is unsaturated; said direct current source comprising a bridge type rectifier connected to a main direct current source through a constant voltage transformer and an auxiliary choke; said bridge type rectifier connected to said flux reversal winding through a first rheostat; said first rheostat driven by a regulator; a second rheostat connected in series with said first rheostat to permit manual adjustment of the direct current supplied to said flux reversal winding.

13. A six contact mechanical rectifier comprising a commutating reactor associated with each contact; a flux reversal circuit for each commutating reactor comprising an alternating current source, a saturable reactor and a flux reversal winding wound on the core of said commutating reactor; a first choke connected in series with a first three of said flux reversal windings; a second choke connected in series with a second three of said flux reversal windings; said first and second choke connected in parallel with each other and in series with a rheostat; said rheostat connected in a circuit to be energized from a direct current source; said direct current source comprising a bridge type rectifier connected to a main alternating current source through a constant voltage transformer and an auxiliary choke; said bridge type rectifier connected to said flux reversal windings through said rheostat.

14. A mechanical rectifier for energizing a direct current load from an alternating current source comprising a pair of cooperable contacts connected in series with said alternating current source and direct current load and means for synchronously operating said contacts into and out of engagement, and a commutating reactor having a main winding connected in series with said cooperable contacts and a flux reversal winding; a flux reversal circuit connected to said flux reversal winding to reverse the flux of said commutating reactor and energizing means for adjustably energizing said flux reversal circuit to energize said flux reversal winding over a predetermined interval of the alternating current cycle.

References Cited in the file of this patent

UNITED STATES PATENTS

| | | |
|---|---|---|
| 2,465,682 | Goldstein | Mar. 29, 1949 |
| 2,466,864 | Prati | Apr. 12, 1949 |
| 2,502,932 | Diebold | Apr. 4, 1950 |
| 2,585,654 | Hewlett | Feb. 12, 1952 |
| 2,680,831 | Belamin | June 8, 1954 |